(12) United States Patent
Augst

(10) Patent No.: US 10,374,379 B2
(45) Date of Patent: Aug. 6, 2019

(54) SYSTEMS, APPARATUS, AND METHODS FOR LASER AMPLIFICATION IN FIBER AMPLIFIERS

(71) Applicant: Massachusetts Institute of Technology, Cambridge, MA (US)

(72) Inventor: Steven J. Augst, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 321 days.

(21) Appl. No.: 15/261,541

(22) Filed: Sep. 9, 2016

(65) Prior Publication Data

US 2018/0261969 A1 Sep. 13, 2018

Related U.S. Application Data

(60) Provisional application No. 62/216,437, filed on Sep. 10, 2015.

(51) Int. Cl.
*H01S 3/00* (2006.01)
*H01S 3/10* (2006.01)
(Continued)

(52) U.S. Cl.
CPC ........ *H01S 3/06754* (2013.01); *H01S 3/0064* (2013.01); *H01S 3/0675* (2013.01);
(Continued)

(58) Field of Classification Search
CPC ... H01S 3/067; H01S 3/06754; H01S 2301/02
See application file for complete search history.

(56) References Cited

U.S. PATENT DOCUMENTS 6,104,527 A * 8/2000 Yang ................... H01S 3/06754
359/341.33
6,151,158 A * 11/2000 Takeda ................ H01S 3/10023
359/337.12
(Continued)

FOREIGN PATENT DOCUMENTS

CN 103414093 11/2013
EP 1734622 12/2006
JP 2012-238781 12/2012

OTHER PUBLICATIONS

Agger et al., "Emission and absorption cross section of thulium doped silica fibers," Optics Express, Vo.14, No. 1, pp. 50-57 (2006).
(Continued)

*Primary Examiner* — Eric L Bolda
(74) *Attorney, Agent, or Firm* — Smith Baluch LLP

(57) ABSTRACT

A fiber amplifier includes an isolator, a gain fiber to amplify an input laser signal, and an optical filter disposed between the isolator and the gain fiber. The optical filter transmits the laser signal and reflects amplified spontaneous emission (ASE) propagating from the gain fiber toward the isolator. The reflected ASE reenters the gain fiber and is absorbed by the gain fiber for amplifying the input laser signal. The optical filter in the amplifier can protect the usually expensive isolator and reduce potential damage to the gain fiber induced by fluctuation of the input laser signal power, as well as reduce potential photodarkening at the input of the gain fiber.

26 Claims, 10 Drawing Sheets

(51) Int. Cl.
*H01S 3/16* (2006.01)
*H01S 3/067* (2006.01)
*H01S 3/094* (2006.01)
*H01S 3/0941* (2006.01)
*H01S 3/08* (2006.01)

(52) U.S. Cl.
CPC .... *H01S 3/08009* (2013.01); *H01S 3/094023* (2013.01); *H01S 3/10015* (2013.01); *H01S 3/10023* (2013.01); *H01S 3/161* (2013.01); *H01S 3/1608* (2013.01); *H01S 3/1616* (2013.01); *H01S 3/1618* (2013.01); *H01S 3/0014* (2013.01); *H01S 3/0078* (2013.01); *H01S 3/06758* (2013.01); *H01S 3/09408* (2013.01); *H01S 3/09415* (2013.01); *H01S 2301/02* (2013.01)

(56) References Cited

U.S. PATENT DOCUMENTS

| | | | |
|---|---|---|---|
| 6,181,467 B1* | 1/2001 | Jung | H01S 3/06758 359/341.31 |
| 7,038,840 B1 | 6/2006 | Yam | |
| 7,190,705 B2 | 3/2007 | Fermann et al. | |
| 7,463,411 B2 | 10/2008 | Demidov et al. | |
| 7,539,231 B1 | 5/2009 | Honea et al. | |
| 8,027,557 B2 | 9/2011 | Frith | |
| 8,229,260 B2 | 7/2012 | Frith | |
| 8,755,642 B2 | 6/2014 | Jiang | |
| 9,071,037 B2 | 6/2015 | Gu et al. | |
| 2002/0003655 A1* | 1/2002 | Park | H01S 3/06754 359/341.1 |
| 2002/0141045 A1* | 10/2002 | Inagaki | H01S 3/06754 359/341.1 |
| 2002/0159736 A1* | 10/2002 | Dejneka | H01S 3/06716 385/127 |
| 2004/0190119 A1* | 9/2004 | Tauser | H01S 3/0057 359/333 |
| 2005/0163426 A1* | 7/2005 | Fermann | H01S 3/06754 385/37 |
| 2006/0082867 A1 | 4/2006 | Starodoumov et al. | |
| 2009/0129410 A1* | 5/2009 | Teshima | H01S 3/094003 372/6 |
| 2010/0061409 A1* | 3/2010 | Kitabayashi | H01S 3/0064 372/6 |
| 2010/0329288 A1* | 12/2010 | Kitabayashi | H01S 3/2308 372/6 |
| 2011/0158267 A1* | 6/2011 | Tsai | H01S 3/0675 372/11 |
| 2011/0279891 A1* | 11/2011 | Miyauchi | H01S 3/06758 359/341.3 |
| 2014/0043674 A1 | 2/2014 | Takasaka et al. | |
| 2014/0049810 A1 | 2/2014 | McComb et al. | |

OTHER PUBLICATIONS

Jetschke et al., "Power-law dependence of the photodarkening rate constant on the inversion in Yb doped fibers," Optics Letters, vol. 34, No. 1, pp. 109-111 (2009).
Nufern, Grating Test 3kW Test Bed, (Jul. 13, 2016).
Otto et al., "Impact of photodarkening on the mode instability threshold," Optics Express, vol. 23, No. 12, 15265, pp. 1-13 (Jun. 2, 2015).
Paschotta et al., "Ytterbium-doped fiber amplifiers," IEEE, Journel of Quantum Electronics, vol. 33, No. 7, pp. 1049-1056 (1997).
Simakov et al., "A cladding-pumped, tunable holmium doped fiber laser," Optics Express, vol. 21, No. 23, 28415, pp. 1-8 (2013).
Wei, et al., "Mid-infrared fluorescence, energy transfer process and rate equation analysis in Er3+ doped germanate glass," Scientific Reports, 4:6060, pp. 1-10 (2014).
International Search Report and Written Opinion issued by the International Searching Authority for International Application No. PCT/US16/51029, dated Dec. 5, 2016, 10 pages.

* cited by examiner

SYSTEMS, APPARATUS, AND METHODS FOR LASER AMPLIFICATION IN FIBER AMPLIFIERS

CROSS-REFERENCES TO RELATED APPLICATIONS

This application claims priority to U.S. Application No. 62/216,437, filed Sep. 10, 2015, entitled "ARCHITECTURE FOR FIBER AMPLIFIERS," which is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

Fiber laser amplifiers are used in a variety of applications, such as low-power marking and cutting, high-power industrial cutting and welding, and high-power defense oriented applications. Fiber lasers can be particularly useful for processing materials that are difficult to process with traditional machining methods. For example, fiber lasers can be used to cut Gorilla Glass™, which is widely used in cell phones. Fiber lasers can be also useful in welding components that may not withstand large quantities of heat. In this case, localized heating by the laser performs the welding without damaging adjacent material.

FIG. 1 shows a schematic of a conventional fiber laser amplifier 100. The amplifier 100 includes an isolator 110 to receive an input signal 105 (e.g., provided by a laser oscillator; now shown in FIG. 1), a gain fiber 120 to amplify the input signal 105, and pump diodes 130 to pump the gain fiber 120. The isolator 110 can transmit the input signal 105 along the forward direction (i.e., from the isolator 110 to the gain fiber 120) but block any input signal 105 propagating along the backward direction (i.e., from the gain fiber 120 to the isolator 110). This prevents the amplified input signal from damaging the source of the input signal 105, such as a laser oscillator. The pump diodes 130 typically pump the cladding of the gain fiber 120. However, for low power applications, core pumping may also be used to reduce or minimize the length of the gain fiber 120.

The amplifier 100 can be operated at high gain (e.g., >17 dB), and there is usually large population inversion at the beginning of the gain fiber 120. At least two adverse side effects can be induced from this large population inversion. First, photodarkening can occur at the beginning of the gain fiber 120, which can reduce the efficiency of the amplifier 100 and increase the heat load. The heat load can be especially problematic in high power amplifiers. Second, significant amplified spontaneous emission (ASE) can be generated in the gain fiber 120, thereby reducing the efficiency of the amplifier 100. The backward propagating ASE can also cause component failure at the input of the fiber amplifier 100. For example, the ASE propagating back to the isolator 110 can damage the isolator 110, which is usually costly.

SUMMARY

Embodiments of the present invention include apparatus, systems, and methods for amplifying laser signals in a fiber amplifier. In one example, a system for amplifying an input laser signal at a signal wavelength includes an isolator to receive the input laser signal. A gain fiber is in optical communication with the isolator to amplify the input laser signal. The gain fiber emits backwards-propagating amplified spontaneous emission (ASE) at an ASE wavelength. At least one pump source is in optical communication with the gain fiber to pump the gain fiber with at least one pump beam at a pump wavelength. The system also includes an optical filter, in optical communication with the isolator and the gain fiber, to transmit at least 50% of the input laser signal from the isolator to the gain fiber and to reflect at least 20% of the backwards-propagating ASE back to the gain fiber. The gain fiber absorbs at least a portion of the backwards-propagating ASE reflected by the optical filter.

In another example, a method of amplifying an input laser signal at a signal wavelength includes transmitting the input laser signal through an isolator and transmitting at least 50% of the input laser signal through an optical filter in optical communication with the isolator. The method also includes amplifying the input laser signal with a gain fiber in optical communication with the optical filter. The gain fiber emits backwards-propagating amplified spontaneous emission (ASE) at an ASE wavelength. The method further includes reflecting at least 20% of the backwards-propagating ASE to the gain fiber, the gain fiber absorbing at least a portion of the backwards-propagating ASE reflected by the optical filter.

In yet another example, a fiber laser amplifier includes an isolator to receive the input laser signal having a signal wavelength within a range of about 1045 nm to about 1100 nm. A gain fiber doped with ytterbium is in optical communication with the isolator to amplify the input laser signal at a gain of at least about 17 dB. The gain fiber further emits a backwards-propagating amplified spontaneous emission (ASE) at an ASE wavelength within a range of about 1010 nm to about 1045 nm. At least one pump source is in optical communication with the gain fiber to pump the gain fiber with at least one pump beam. The amplifier also includes a fiber Bragg grating (FBG), in optical communication with the isolator and the gain fiber and having a transmissivity of at least 50% at the signal wavelength and a reflectivity greater than 20% at the ASE wavelength, to transmit the input laser signal from the isolator to the gain fiber and to reflect the backwards-propagating ASE back to the gain fiber.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1:
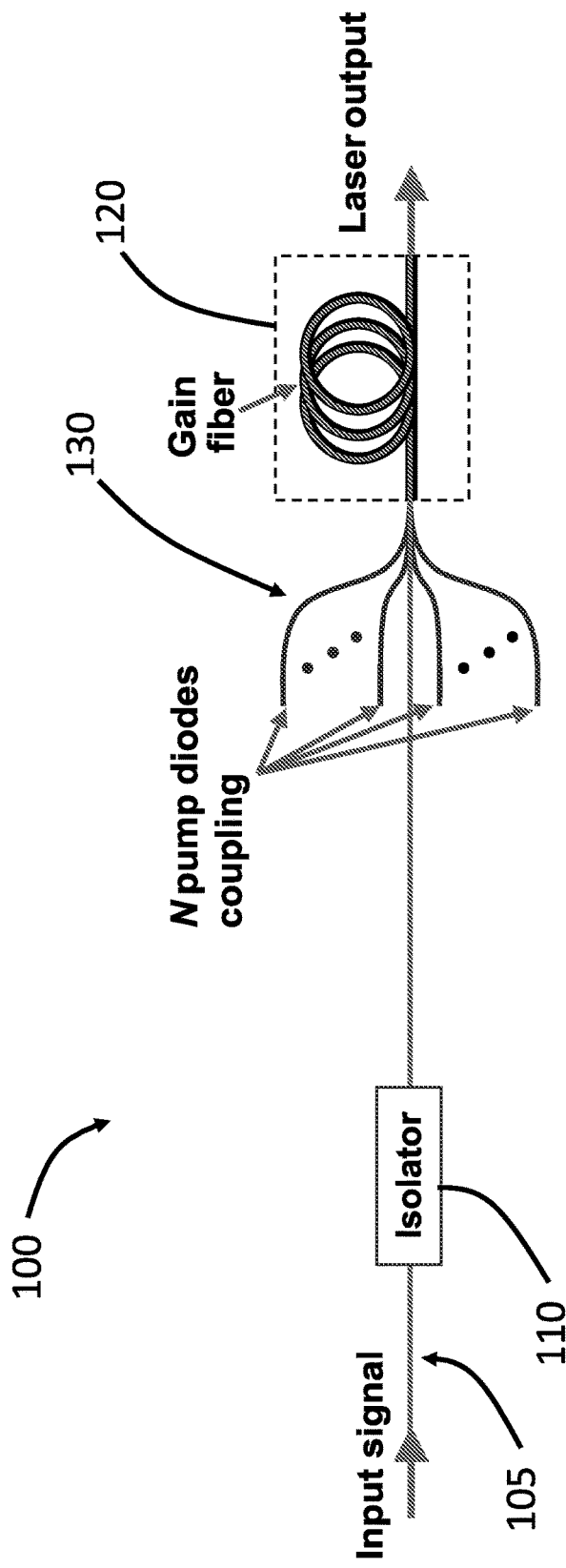
FIG. 1 shows a schematic of a conventional fiber laser amplifier.

To address the problems of photodarkening and amplified spontaneous emission (ASE) in conventional fiber amplifiers, systems, apparatus, and methods described herein employ a fiber amplifier architecture, with an optical filter (e.g., a fiber Bragg grating (FBG), or dielectric bandpass filter) inserted between an isolator and a gain fiber. The optical filter transmits the input laser signal but reflects the ASE propagating from the gain fiber toward the isolator. The reflected ASE then reenters the gain fiber, which absorbs the ASE to create population inversion that can amplify the laser signal, especially at portions closer to the end of the gain fiber.

This fiber amplifier architecture has several advantages over conventional fiber amplifier architectures. First, the optical filter can protect the isolator from backward propagating ASE. As understood in the art, optical isolators (e.g., using Faraday rotator and polarizers) can be susceptible to optical damage caused by backward travelling light. The optical filter, by reflecting at least a portion of the ASE back to the gain fiber before the ASE reaches the isolator, can reduce the amount of backward propagating ASE that is incident on the isolator. Therefore, the optical filter can improve the robustness of the isolator, making it less susceptible to failure.

In addition, the optical filter also makes it possible to use a less expensive, smaller isolator. As understood by those of skill in the art, the cost of an isolator scales with the degree of isolation—isolators that provide more isolation are generally more expensive than isolators that provide less isolation. By reducing the amount of backwards-propagating ASE that reaches the isolator, the optical filter makes is possible to achieve the same performance as in conventional fiber amplifier with a smaller, less expensive isolator. Moreover, because an isolator is typically about 5 times to about 50 times more expensive than the optical filter (e.g., an FBG), the total system cost is lower, too.

Second, reflecting the ASE back to the gain fiber can reduce the possibility of damaging the gain fiber. In fiber amplifiers, loss of seed power can lead to damage in the fiber amplifier from thermal or transient effects, such as Q-switching. Re-injecting the ASE light back to the gain fiber can make the amplifier less sensitive to a reduction or complete loss of seed power. As the seed power is decreased, the amount of ASE can increase. Since the backward propagating ASE is retro-reflected back into the gain fiber, the amplifier can then be seeded with the ASE light which can de-populate the upper lasing state and make it less likely for the amplifier to suffer damage.

Third, re-injecting the ASE light into the gain fiber can reduce the population inversion at the beginning (i.e., input end) of the gain fiber, thereby reducing the amount of photodarkening. This can prolong the life of the gain fiber and reduce the thermal load on the gain fiber. Additionally for large mode area fibers, photodarkening may also lead to multi-mode instabilities, which are undesirable in high power amplifiers. By reducing photodarkening, the optical filter can also reduce susceptibility to multi-mode instabilities.

Fourth, the optical filter can improve thermal management of the gain fiber. The retro-reflected ASE in the gain fiber can receive more gain than the signal wavelength. Since the quantum defect at the ASE wavelength is generally lower than that at the signal wavelength, the heat generated from the production of ASE photons is usually lower than the heat generated for the production of signal photons. As the ASE is re-absorbed further down the fiber, the ASE can act as a source of gain for the signal light, which can be further amplified. The net result is that the heat load is distributed more uniformly throughout the length of the fiber, rather than being concentrated near the front end as in conventional fiber amplifiers. By reducing the localized thermal load, the optical filter can also reduce the susceptibility to multi-mode instabilities.

Fifth, the optical filter can also suppress stimulated Brillouin scattering (SBS) instability. As described above, a fiber amplifier including the optical filter can have a smaller signal power towards the fiber input than a conventional fiber amplifier. In this case, the effective fiber length can be shorter than, for example, the distance for SBS to develop into SBS instability, thereby reducing the possibility of SBS instability. Reduction in the effective SBS length is desirable since SBS can adversely affect the performance of fiber amplifiers.

Fiber Amplifiers Including Optical Filters

Figure 2:
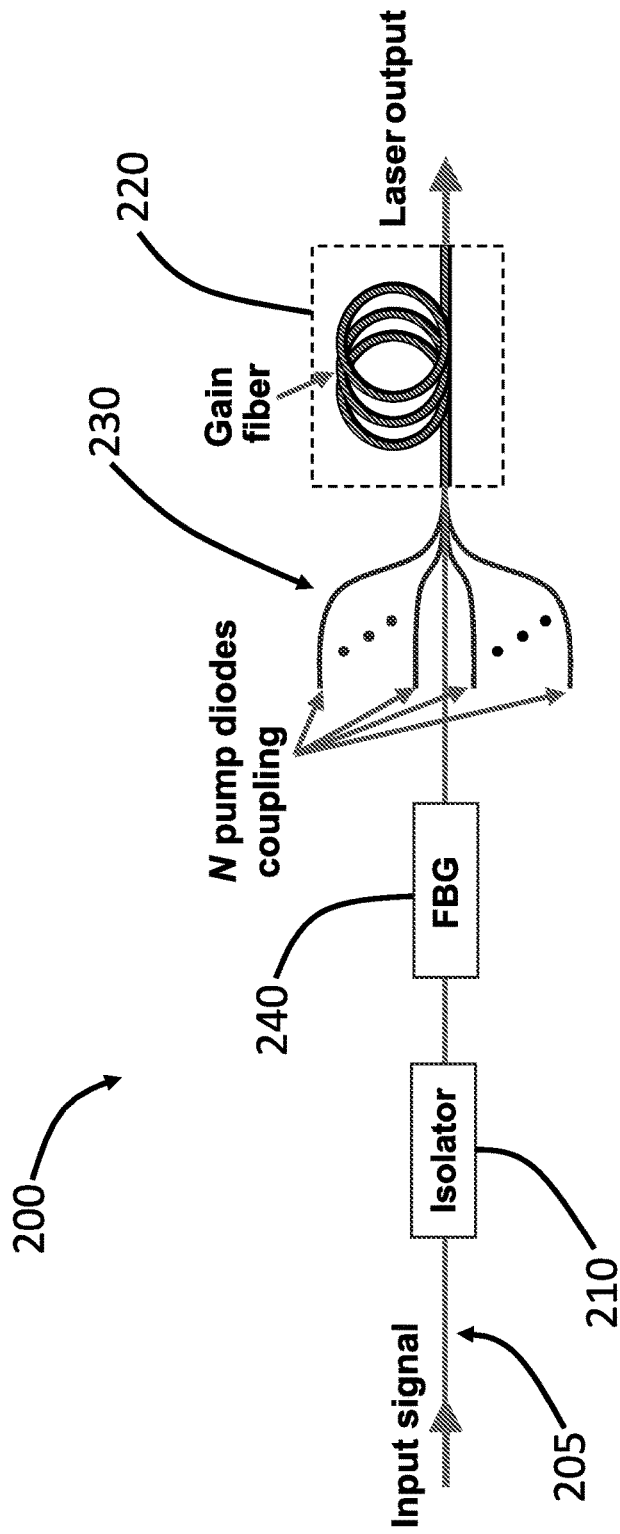
FIG. 2 shows a schematic of a fiber laser amplifier including an optical filter to reflect backward amplified spontaneous emission (ASE) back to the gain medium for reabsorption.

FIG. 2 shows a schematic of a fiber amplifier 200 with an optical filter 240 to reflect backward ASE for reabsorption in a gain fiber 220. The amplifier 200 includes an isolator 210 to receive an input laser signal 205 at a signal wavelength. The input laser signal 205 can be delivered by, for example, a laser oscillator or by another fiber (pre)amplifier. The input laser signal 205 propagates through the optical filter 240 and enters the gain fiber 220, which is pumped by one or more pump sources 230 operating at a pump wavelength. Typically, the spontaneous emission of the gain material in the gain fiber 220 can be amplified to form ASE having a center wavelength referred to as an ASE wavelength in this application. The ASE can propagate in both the forward direction (i.e., same direction as the input laser signal 205) and the backward direction (i.e., opposite to the direction of the input laser signal 205). The optical filter 240 reflects at least a portion of the backward ASE back to the gain fiber 220, which then absorbs the reflected ASE to amplify the input laser signal 205.

The amplifier 200 can be used at any suitable power level. For example, the power of the input laser signal 205 can be at least than 5 mW (e.g., at least 5 mW, at least 10 mW, at least 20 mW, at least 50 mW, at least 100 mW, at least 200 mW, at least 500 mW, at least 1 W, at least 2 W, at least 5 W, at least 10 W, at least 20 W, at least 50 W, or greater, including any values and sub ranges in between). After amplification, the output of the amplifier 200 can have a power that is at least 0.2 W (e.g., at least 0.2 W, at least 0.5 W, at least 1 W, at least 2 W, at least 5 W, at least 10 W, at least 20 W, at least 50 W, at least 100 W, at least 200 W, at least 500 W, at least 1 kW, at least 2 kW, or at least 5 kW, including any values and sub ranges in between).

The isolator 210 in the amplifier 200 is employed to protect the source of the input laser signal 205 (e.g., a laser oscillator). The isolator 210 transmits the input laser signal 205 and rejects amplified signal returning from the gain fiber 220 so as to prevent the amplified signal from reaching any components upstream of the isolator 210. In one example, the isolator 210 can include a Faraday rotator placed between an input polarizer and an output polarizer. In another example, the isolator 210 can include an all-fiber optical isolator. More information about fiber isolators can be found in U.S. Pat. No. 8,755,642, which is hereby incorporated herein by reference in its entirety.

The gain fiber 220 typically includes a gain material doped into an optical fiber. The gain material can be characterized by its absorption and emission cross sections (also referred to as absorption spectrum and emission spectrum). In general, the signal wavelength of the input laser signal 205 can be a wavelength at which the gain material has an emission cross section that is larger than the absorption cross section. The ASE wavelength of the ASE is usually approximately at a wavelength at which the emission cross section of the gain material has a peak. The pump wavelength of the pump sources 230, in contrast, can be a wavelength at which the gain material has a large absorption cross section.

In one example, the emission cross section at the ASE wavelength can be larger than the emission cross section at the signal wavelength, and the absorption cross section at the ASE wavelength can be larger than the absorption at the signal wavelength. As understood in the art, ASE can be broadband and can have a bandwidth of, for example, about 5 nm to about 100 nm (the ASE wavelength described here can be the center wavelength of the ASE light propagating in the gain fiber 220).

The relative magnitudes of the three wavelengths (i.e., the signal wavelength, the ASE wavelength, and the pump wavelength) in the amplifier 200 can be: the signal wavelength is longer than the ASE wavelength, which in turn is longer than the pump wavelength.

In one example, the gain fiber 220 includes a single-mode fiber doped with the gain material. In another example, the gain fiber 220 includes a multi-mode fiber doped with the gain medium. A multi-mode fiber can have a larger cross sectional area, compared to single-mode fibers, and therefore allow the amplifier 200 to have higher output energy. In one example, the gain fiber 220 includes a single-clad fiber made of a core surrounded by a cladding. In another example, the gain fiber includes a double-clad fiber made of a core surrounded by two layers of cladding materials.

The gain fiber 220 can amplify the input laser signal 205 at various amplification ratios, also referred to as gain. For example, the gain of the gain fiber 220 for the input laser signal 205 can be at least 15 dB (e.g., at least 15 dB, at least 16 dB, at least 17 dB, at least 20 dB, at least 25 dB, at least 30 dB, or at least 35 dB, including any values and sub ranges in between).

The gain material in the gain fiber 220 can include, for example, ytterbium, thulium, erbium, praseodymium, or holmium, or combinations of these materials, among others. More details of the gain materials in the gain fiber 220 are described below with reference to FIGS. 4-8.

The pump sources 230 can include pump diodes with output coupled into fibers that deliver the pump beams into the gain fiber 220. In one example, the pump beams are coupled into the cladding of the gain fiber 220. In another example, the pump beam can be coupled into the core of the gain fiber 220.

The pump sources 230 deliver pump beams propagating in the forward direction. In practice, the pump sources 230 can also deliver pump beams propagating along the backward direction (i.e., opposite the propagation of the input laser signal 205). In another example, the pump sources 230 can deliver some pump beams propagating along the forward direction and some pump beams along the backward direction.

The optical filter 240, as described above, transmits the input laser signal 205 and reflects the ASE. The transmission of the optical filter 240 at the signal wavelength can be at least 50% (e.g., at least 50%, at least 55%, at least 60%, at least 65%, at least 70%, at least 75%, at least 80%, at least 85%, at least 90%, at least 95%, at least 97%, at least 98%, or at least 99%, including any values and sub ranges in between).

The reflectivity of the optical filter 240 at the ASE wavelength can be at least 20% (e.g., at least 20%, at least 30%, at least 40%, at least 50%, at least 55%, at least 60%, at least 65%, at least 70%, at least 75%, at least 80%, at least 85%, at least 90%, at least 95%, at least 97%, at least 98%, or least 99%, including any values and sub ranges in between). As described above, the ASE usually has a finite bandwidth, with the ASE wavelength at the center of the spectrum. Accordingly, the reflectivity (also referred to as the reflection spectrum) of the optical filter 240 can also have the finite bandwidth that overlaps with or encompasses the ASE bandwidth so that the optical filter 240 can reflect most spectral components in the ASE. For example, the bandwidth of the optical filter 240 can be about 1 nm to about 100 nm (e.g., about 1 nm, about 2 nm, about 3 nm, about 5 nm, about 10 nm, about 15 nm, about 20 nm, about 25 nm, about 30 nm, about 40 nm, about 50 nm, about 60 nm, about 70 nm, about 80 nm, about 90 nm, or about 100 nm, including any values and sub ranges in between).

The optical filter 240 can also be substantially transparent to the pump beams at the pump wavelength. For example, the transmission of the optical filter 240 at the pump wavelength can be at least 50% (e.g., at least 50%, at least 55%, at least 60%, at least 65%, at least 70%, at least 75%, at least 80%, at least 85%, at least 90%, at least 95%, at least 97%, at least 98%, or at least 99%, including any values and sub ranges in between).

The optical filter 240 as shown in FIG. 2 is placed between the isolator 210 and the gain fiber 220. In one example, the optical filter 230 can be placed upstream of the location where the pump beams are coupled into the gain fiber 220. In another example, the optical filter 230 can be placed between the gain fiber 220 and the location at which the pump beams are coupled into the gain fiber 220.

Various types of filters can be used as the optical filter 240 in the amplifier 200. In one example, the optical filter 240 includes an all-dielectric bandpass filter, which can further include two highly reflecting mirrors separated by one or more dielectric spacer layers. In another example, the optical filter 240 can include a metal-dielectric bandpass filter, which usually uses a metal spacer layer between two reflectors. The mirrors can be made of alternating high and low refractive index materials to form a stack, which can have a reflectance greater than 99.99% at a specified wavelength. Varying the thickness of the spacer layer and/or the number of reflecting layers can alter the central wavelength and bandwidth of the resulting filter.

The center wavelength of the all-dielectric or dielectric-metal bandpass filters (collectively referred to as bandpass filters) can shift linearly with changes in temperature. Therefore, a heater can be used to adjust the central wavelength of the bandpass filters. This may be used to compensate for possible wavelength shifts in the gain fiber 220.

The optical filter 240 can also use fiber Bragg grating (FBG) to transmit the input laser signal 205 and reflect the backward ASE. As understood in the art, an FBG can include a periodic variation in the refractive index of the fiber core, which can generate a wavelength-specific reflection (and transmission). In one example, the optical filter 240 includes a uniform FBG, which has a uniform grating period along the length of the FBG. The bandwidth of the FBG can be adjusted by tuning the grating strength and/or the grating length so as to, for example, reflect most of the spectral components in a broadband ASE light.

In another example, the optical filter 240 includes an FBG having an apodized grating. The term apodization can refer to the grading of the refractive index to approach zero at the end of the grating. Apodized gratings can offer significant improvement in side-lobe suppression while maintaining reflectivity and a narrow bandwidth. The two functions typically used to apodize an FBG are Gaussian and raised-cosine.

In yet another example, the optical filter 240 includes an FBG having a chirped grating, in which grating period varies (e.g., linearly) along the length of the grating. The reflected wavelength can change with the grating period, thereby broadening the reflected spectrum.

In yet another example, the optical filter 240 includes an FBG having a tilted grating. In standard FBGs, the grading or variation of the refractive index is along the length of the fiber, and is typically uniform across the width of the fiber. In a tilted FBG (TFBG), the variation of the refractive index can be at an angle with respect to the optical axis. The angle of tilt in a TFBG can adjust the reflected wavelength, and bandwidth.

The ASE reflected by the optical filter 240 reenters the gain fiber 220, which absorbs at least a portion of the reflected ASE for amplifying the input laser signal 205. In general, it can be helpful for the gain fiber 220 to absorb substantially all of the reflected ASE. The absorption of the reflected ASE by the gain fiber 220 can be at least 90% (e.g., at least 90%, at least 91%, at least 92%, at least 93%, at least 94%, at least 95%, at least 96%, at least 97%, at least 98%, at least 99%, or at least 99.5%, including any values and sub ranges in between). Alternatively, the absorption of the ASE can be quantified in dB (e.g., at least 10 dB, at least 13 dB, at least 18 dB, at least 19 dB, at least 20 dB, at least 25 dB, at least 30 dB, including any values and sub ranges in between).

Substantial absorption of the reflected ASE in the gain fiber 220 can be achieved by, for example, increasing the absorption cross section of ASE or increasing the length of the gain fiber 220. The length of the gain fiber 220 can be at least 1 meter (e.g., at least 1 meter, at least 2 meters, at least 3 meters, at least 5 meters, at least 10 meters, at least 20 meters, at least 30 meters, or at least 50 meters, including any values or sub ranges in between).

The amplifier 200 shown in FIG. 2 includes only one stage of amplification achieved by the gain fiber 220. In practice, more than one stage of amplification can also be used. For example, a second stage of amplification can be coupled to the output of the gain fiber 220. The second stage of amplification can include a second isolator, a second optical filter, and a second gain fiber pumped by another set of pump diodes. In one example, the first stage of amplification (i.e., gain fiber 220) can use a fiber having a small effective mode area and the second stage of amplification can use a double-clad fiber with a larger mode area. In another example, the pump diodes in the first stage can deliver pump beans into the core of the gain fiber 220, while the pump diodes in the second stage can deliver pump beams into the cladding of the fiber. In yet another example, additional components can be disposed between the first stage and the second stage, such as a beam shaping element, a gain flattening element, or a coupler to couple out a portion of the output beam after the first stage for monitoring the operation of the amplifier 200.

Fiber Amplifiers with Multiple Optical Filters

Figure 3:
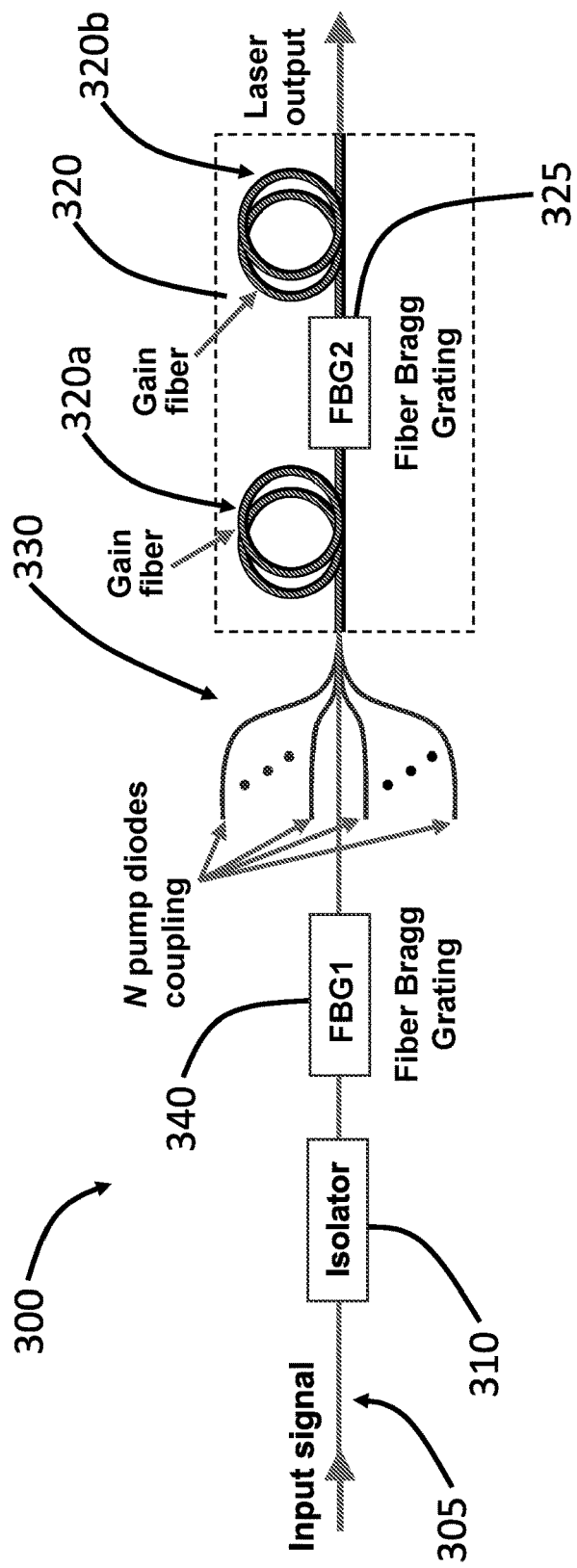
FIG. 3 shows a schematic of a fiber laser amplifier including two optical filters for ASE reabsorption and power stability.

FIG. 3 shows a schematic of an amplifier 300 including two optical filters to increase the power stability of the amplifier 300. The amplifier 300 includes an isolator 310 to receive an input laser signal 305 (at a signal wavelength) and transmits the input laser signal 305 to a first optical filter 340. A gain fiber 320, pumped by pump sources 330, receives and amplifies the input laser signal 305. The gain fiber 320 includes a first portion 320a and a second portion 320b, between which a second optical filter 325 is disposed.

The first optical filter 340 and the second optical filter 325 can include any of the examples of the optical filter 240 described above. In one example, the second optical filter 325 can include an FBG directly written into the gain fiber 320. In another example, the second optical filter 325 can include an FBG fabricated into a passive fiber, which is then spliced into or connected to the gain fiber 320. Since the second optical filter 325 is disposed between the two portions 320a and 320b of the gain fiber 320, the second optical filter 325 can reflect backward ASE from the second portion 320b of the gain fiber 320 and also the forward ASE from the first portion 320a of the gain fiber. In this manner, the first optical filter 340 and second optical filter 325 can form an oscillator cavity at the ASE wavelength so that the ASE can oscillate in the gain fiber 320a (i.e., the gain fiber 320a can lase at the ASE wavelength). Oscillation at the ASE wavelength within the gain fiber 320a, in turn, can core-pump the gain fiber 320b and amplify the input laser signal 305. Therefore, the second optical filter 325 can increase the uniformity of the signal gain distribution along the gain fiber 320 and improve the power stability of the amplifier 300.

In the amplifier 300, the reflectivity of the first optical filter 340 at the ASE wavelength can be at least 95% (e.g., at least 95%, at least 96%, at least 97%, at least 98%, at least 99%, or at least 99.5%, including any values and sub ranges in between). In addition, the transmission of the first optical filter 340 at the signal wavelength can be at least 95% (e.g., at least 95%, at least 96%, at least 97%, at least 98%, at least 99%, or at least 99.5%, including any values and sub ranges in between).

The second optical filter 325 can have a reflectivity close to or less than 10% at the ASE wavelength (e.g., about 0.5%, about 1%, about 2%, about 3%, about 4%, about 5%, about 6%, about 7%, about 8%, about 9%, about 10%, including any values and sub ranges in between). This allows the propagation of ASE between the two portions 320a and 320b. The reflectivity of the second optical filter 325 at the signal wavelength can be close to 0% (e.g., less than 5%, less than 2%, less than 1%, less than 0.5%, less than 0.1%, less than 0.05%, less than 0.01%, less than 0.005%, or less than 0.0001%, including any values or sub ranges in between).

The second reflectivity bandwidth of the second optical filter 325 can be less than the first reflectivity bandwidth of the first optical filter 340. For example, a ratio of the second bandwidth to the first bandwidth can be about 0.1 to about 0.99 (e.g., about 0.1, about 0.3, about 0.4, about 0.5, about 0.6, about 0.7, about 0.8, about 0.9, about 0.95, or about 0.99, including any values and sub ranges in between). In one example, the second bandwidth can be about 1 nm to about 10 nm (e.g., about 1 nm, about 2 nm, about 3 nm, about 4 nm, about 5 nm, about 6 nm, about 7 nm, about 8 nm, about 9 nm, or about 10 nm, including any values and sub ranges in between).

The full reflectivity bandwidth of the second optical filter 325 can be entirely within the reflectivity of the first optical filter 340. For example, the second optical filter 325 can reflect light at wavelengths between $\lambda_{2a}$ and $\lambda_{2b}$. The first optical filter 340 can reflect light at wavelengths between $\lambda_{1a}$ and $\lambda_{1b}$, where $\lambda_{2a} \geq \lambda_{1a}$ and $\lambda_{2b} \leq \lambda_{1b}$. In addition, the center wavelengths of the first reflectivity bandwidth of the first optical filter 340 and the second reflectivity bandwidth of the first optical filter 325 can be substantially close to each other.

The length of the second portion 320b of the gain fiber 320 after the second optical filter 325 can be sufficiently long so as to absorb a signification portion of the ASE propagating in the fiber core. For example, the second portion 320b can absorb at least 90% of the ASE wavelength (e.g., about 90%, about 92%, about 95%, about 98%, about 99%, or about 100%, including any values and sub ranges in between).

The ratio of the first length of the first portion 320a to the second portion 320b can be about 3 to about 0.1 (e.g., about 3, about 2, about 1, about 0.5, about 0.4, about 0.3, about 0.2, or about 0.1, including any values and sub ranges in between). For example, the first length of the first portion 320a can be half of the second length of the second portion 320b, in which case about ⅔ of the total length of the gain fiber 320 is allocated to the second portion 320b.

Gain Materials in Fiber Amplifiers with Reabsorption of ASE

Various types of gain materials can be used in the amplifiers 200 and 300 shown in FIG. 2 and FIG. 3, respectively. Examples of gain materials include, but are not limited to, ytterbium, thulium, erbium, praseodymium, and/or holmium, and combinations of these among others.

Figure 4:
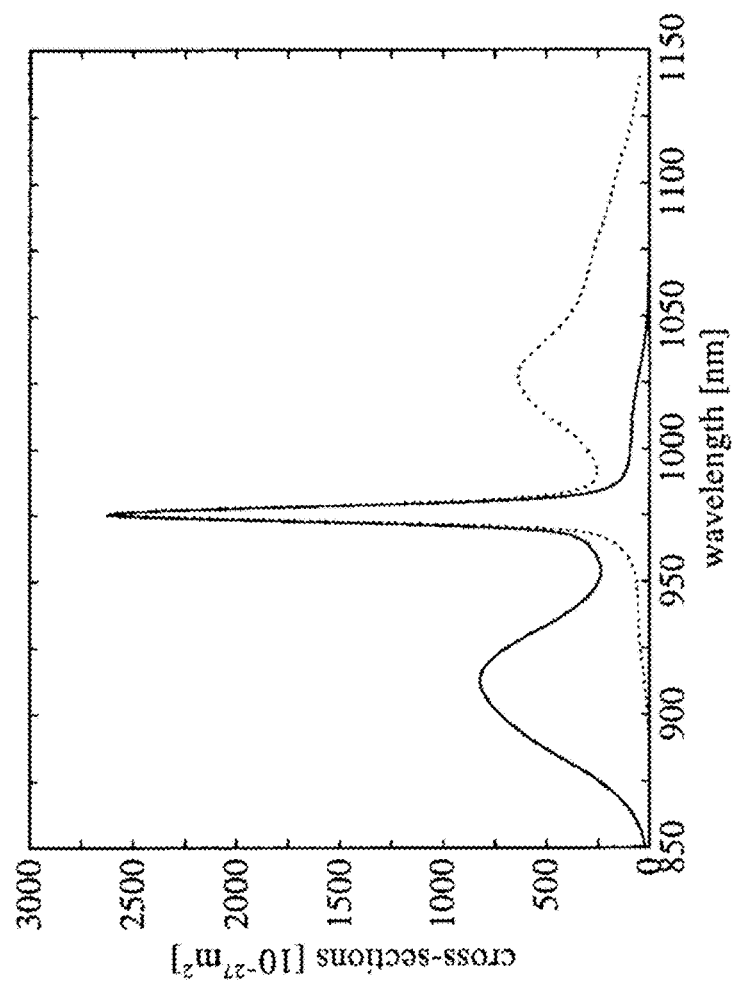
FIG. 4 shows absorption and emission cross sections of Yb doped in germanosilicate glass that can be used in the amplifiers shown in FIGS. 2 and 3.

FIG. 4 shows the absorption (solid) and emission (dotted) cross sections of Yb: Germanosilicate glass that can be used as the gain material in the amplifiers shown in FIGS. 2 and 3. In this case, the signal wavelength can be within a range of about 1045 nm to about 1100 nm (e.g., about 1045 nm, about 1050 nm, about 1055 nm, about 1060 nm, about 1065 nm about 1070 nm, about 1080 nm, about 1090 nm, or about 1100 nm, including any values and sub ranges in between), and the ASE wavelength can be within a range of about 1010 nm to about 1045 nm (e.g., about 1010 nm, about 1015 nm, about 1020 nm, about 1025 nm, about 1030 nm, about 1035 nm, or about 1045 nm, including any values and sub ranges in between). The pump wavelength can be near the 976 nm peak in the absorption cross section. In one example, the ASE that is generated in the amplifier can be predominantly near the high-gain peak around 1030 nm.

The ASE in a gain fiber (e.g., 220 or 320) can include forward propagating ASE and backward propagating ASE. Forward propagating ASE can be mostly re-absorbed in the gain fiber and can act as a core pump for the signal wavelength. Backward propagating ASE may experience little absorption and can exit the gain fiber, propagating backwards until it reaches the optical filter (e.g., 240 shown in FIG. 2, 340 or 325 shown in FIG. 3).

Figure 5A:
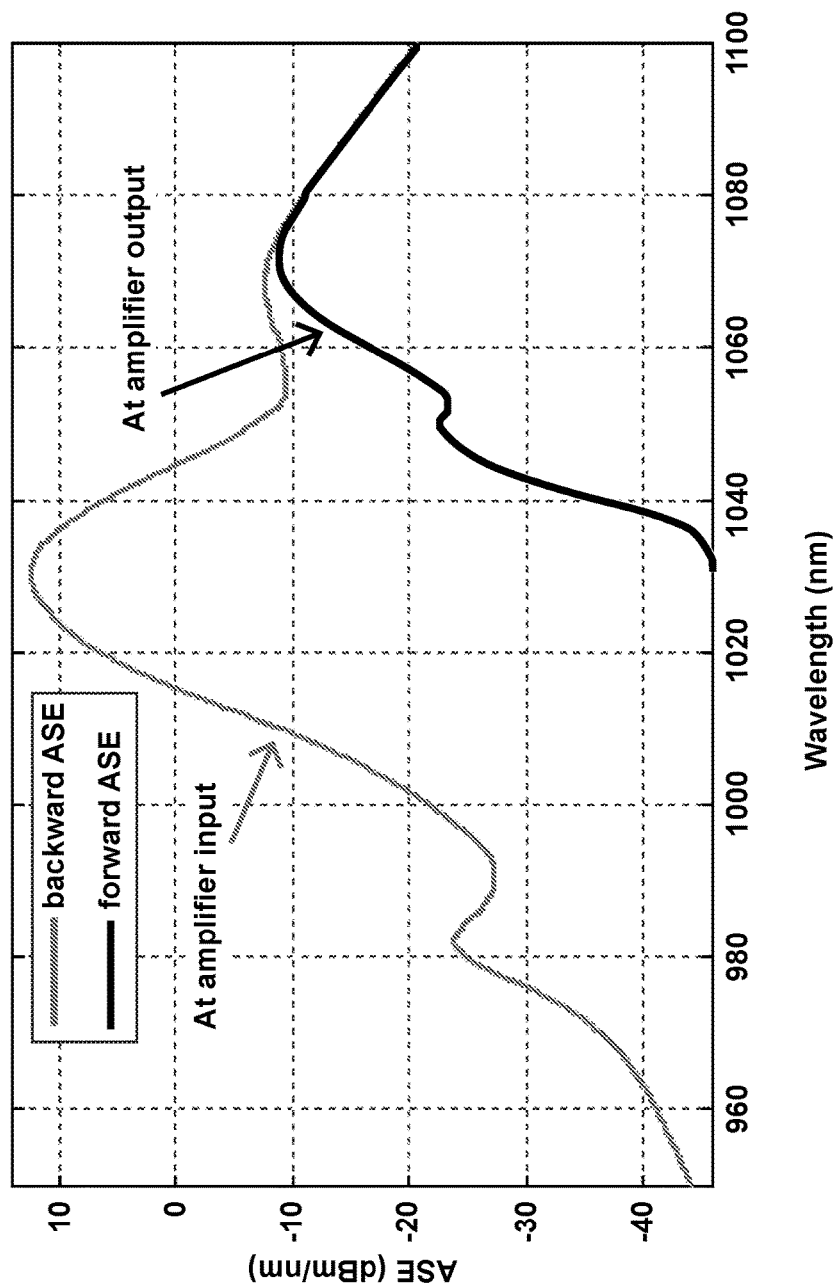
FIG. 5A shows calculated forward and backward ASE spectra in a fiber amplifier using 2 kW pump power, 1064 nm seed wavelength, and 3 W seed power.
Figure 5B:
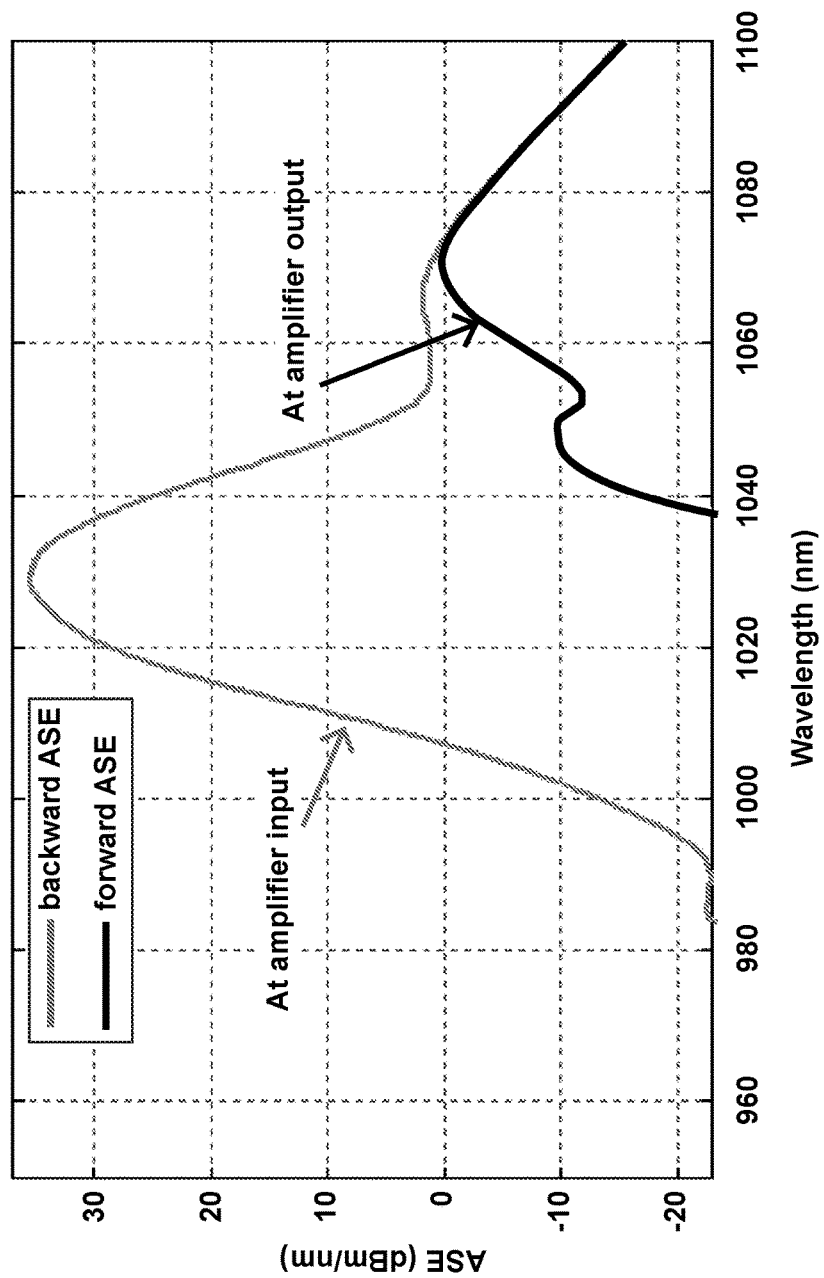
FIG. 5B shows calculated forward and backward ASE spectra in a fiber amplifier using 2 kW pump power, 1064 nm seed wavelength, and 0.3 W seed power.

FIGS. 5A and 5B show calculated ASE spectra for the case of 2 kW pump light at 976 nm and an input signal at 1064 nm of 3 W and 0.3 W, respectively. The backward travelling ASE can be many orders of magnitude larger than the forward propagating ASE in both cases (with 3 W input signal and 0.3 W input signal). It is notable that the ASE grows quickly from 260 mW to 45 W as the seed power decreases from 3 W to 0.3 W. Insertion of an FBG described above can mitigate this problem for insufficient seed power.

The optical filter (e.g., FBG or dielectric bandpass filter) as described above transmits the input signal wavelength with high efficiency and reflects light in a band near 1030 nm. The reflection bandwidth can be as narrow as 0.5 nm or be very broadband as long as the input signal is not reflected. In practice, the reflection bandwidth can be tailored to be compatible with the pump and signal wavelengths. As an example, a reflection linewidth of about 35 nm (i.e., spanning a band from about 1015 nm to about 1050 nm) can be used for 976 nm pump light and a 1064 nm signal. The purpose of the FBG filter is to reflect the ASE light back into the gain fiber, where the ASE light is eventually re-absorbed by the Yb, acting as a core pump for the input signal wavelength.

The pump wavelength can also be in the 875 nm-950 nm band. In this case the dominant ASE can be near the 975 nm peak, and the FBG can accordingly reflect light at 975 nm. If the signal is in the 1050 nm-1100 nm range, the FBG can be most effective if it also reflects the 1030-nm band of ASE.

Figure 6:
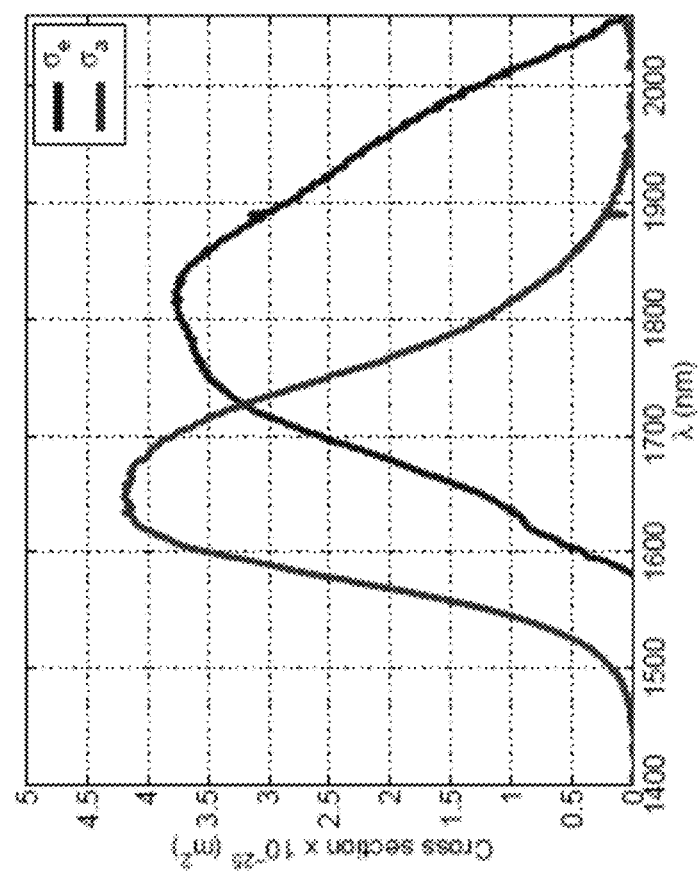
FIG. 6 shows absorption and emission cross sections of thulium in silica fiber.

FIG. 6 shows the absorption and emission cross sections for Tm-doped fiber that can be used as the gain fiber in the amplifiers illustrated in FIGS. 2 and 3. In this case, the signal wavelength can be within a range of about 1900 nm to about 2100 nm (e.g., about 1900 nm, about 1950 nm, about 2000 nm, about 2050 nm, or about 2100 nm, including any values and sub ranges in between), and the ASE wavelength can be within a range of about 1700 nm to about 1900 nm (e.g., about 1700 nm, about 1750 nm, about 1800 nm, about 1850 nm, or about 1900 nm, including any values and sub ranges in between).

In one example, thulium fiber lasers can be operated at wavelengths far above the peak emission near 1800 nm. For operation near 2000 nm, there can be significant ASE near the 1800 nm peak. In this case, the optical filter can accordingly reflect ASE near 1800 nm, which can then core-pump the gain fiber, when reabsorbed by the gain fiber, for operation near 2000 nm.

Figure 7:
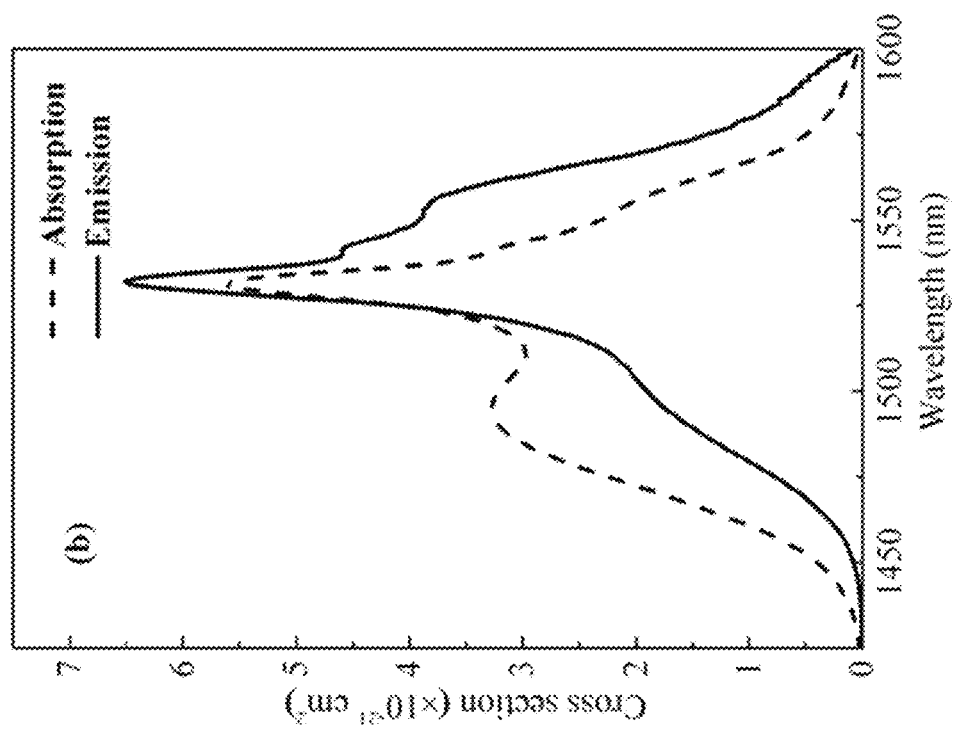
FIG. 7 shows absorption and emission cross sections of erbium in germanate glass.

FIG. 7 shows absorption and emission cross sections for Er-doped germinate glass. Erbium can be used as the gain medium for the gain fiber in the amplifiers illustrated in FIGS. 2 and 3. Cross-sections for other glass chemistries may alter these cross sections slightly but in the same general range. In this case, the signal wavelength can be within a range of about 1535 nm to about 1555 nm (e.g., about 1535 nm, about 1540 nm, about 1545 nm, about 1550 nm, or about 1555 nm, including any values and sub ranges in between), and the ASE wavelength can be within a range of about 1515 to about 1535 nm (e.g., about 1515 nm, about 1520 nm, about 1525 nm, about 1530 nm, or about 1535 nm, including any values and sub ranges in between).

Figure 8:
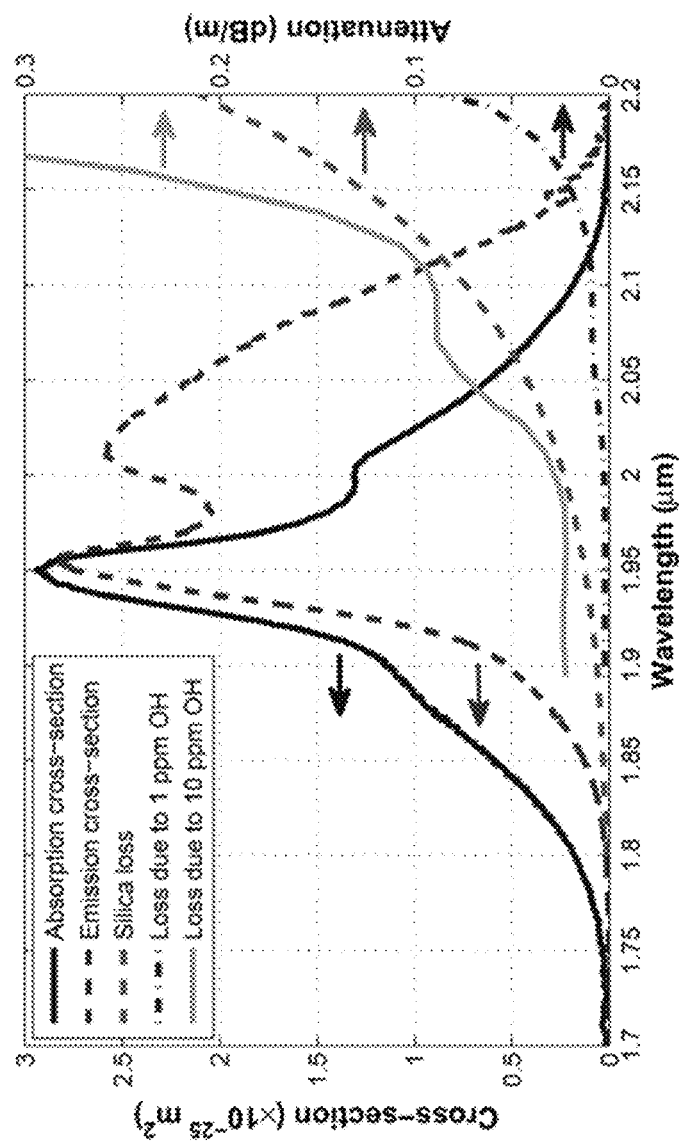
FIG. 8 shows absorption and emission cross sections of holmium in silica fiber.

FIG. 8 shows absorption and emission cross sections for holmium-doped optical fibers that can be used as the gain fiber in the amplifiers illustrated in FIGS. 2 and 3. In this case, the signal wavelength can be within a range of about 2040 nm to about 2170 nm (e.g., about 2040 nm, about 2060 nm, about 2080 nm, about 2100 nm, about 2120 nm, about 2140 nm, about 2160 nm, or about 2170 nm, including any values and sub ranges in between), and the ASE wavelength can be within a range of about 1970 nm to about 2040 nm (e.g., about 1970 nm, about 1990 nm, about 2010 nm, about 2030 nm, or 2040 nm, including any values and sub ranges in between).

In addition to examples of gain materials described above, praseodymium-doped fibers can also be used in the amplifiers illustrated in FIGS. 2 and 3. Praseodymium-doped fibers can be pumped at wavelengths of about 1030 nm to about 1050 nm, and deliver output beams at around 1300 nm, which is within the second telecom window.

Methods of Amplifying Laser Signals

Figure 9:
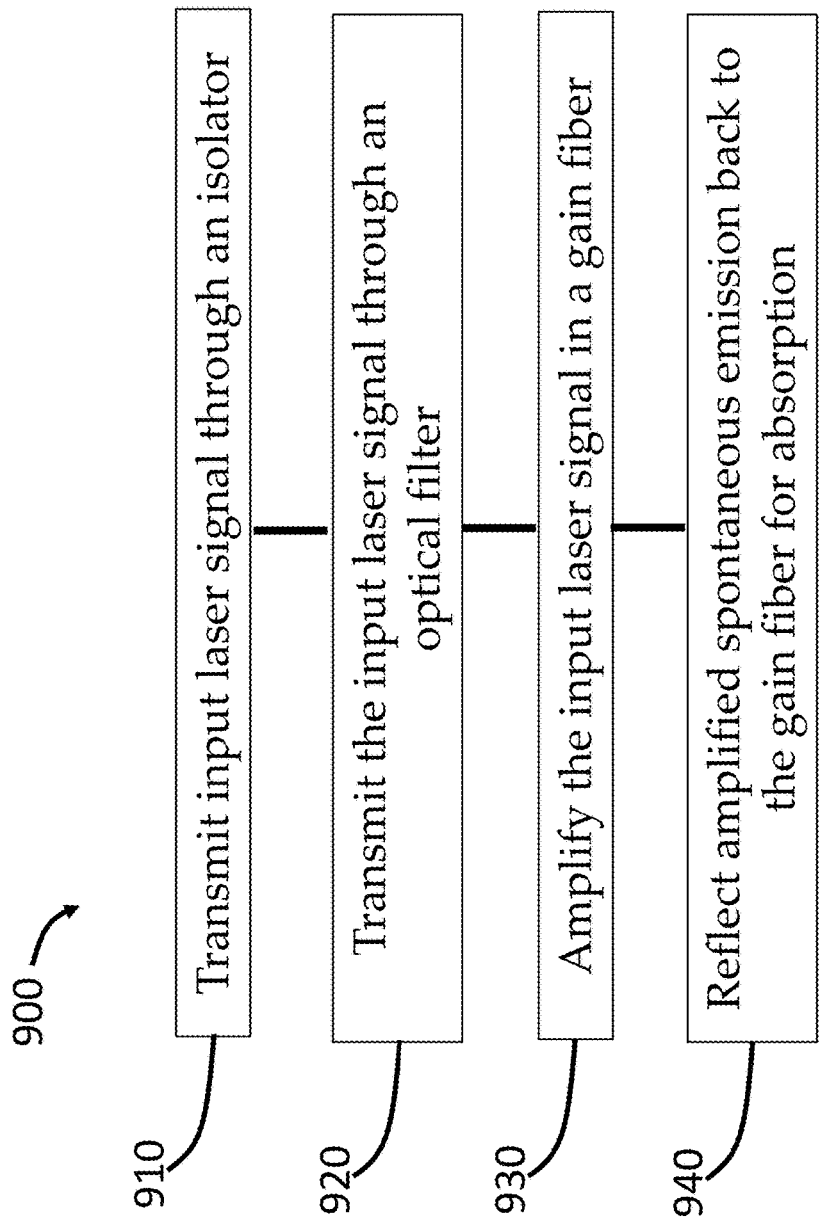
FIG. 9 illustrates a method of amplifying a laser signal in a fiber amplifier.

FIG. 9 illustrates a method 900 of amplifying a laser signal at a signal wavelength. At step 910 in the method 900, the input laser signal is transmitted through an isolator (e.g., isolator 210 shown in FIG. 2 or isolator 310 shown in FIG. 3). After the isolator, at step 920 in the method 900, the input laser signal propagates through an optical filter (e.g., optical filter 240 shown in FIG. 2, or optical filter 340 shown in FIG. 3), which transmits at least 50% of the input laser signal. The transmitted input laser signal is then amplified by a gain fiber (e.g., gain fiber 220 shown in FIG. 2 or gain fiber 320 shown in FIG. 3) at step 930. The gain fiber also propagates backwards-propagating amplified spontaneous emission (ASE) at an ASE wavelength. At step 940, the optical filter reflects at least 20% of the backwards-propagating ASE to the gain fiber, where at least a portion of the reflected ASE is absorbed.

In one example, amplifying the input laser signal at step 930 can be achieved by using a gain fiber doped with ytterbium, in which case the signal wavelength can be within a range of about 1045 nm to about 1100 nm, and the ASE wavelength can be within a range of about 1010 nm to about 1045 nm.

In another example, amplifying the input laser signal at step 930 can be achieved by using a gain fiber doped with thulium, in which case the signal wavelength can be within a range of about 1900 nm to about 2100 nm, and the ASE wavelength can be within a range of about 1700 nm to about 1900 nm.

In yet another example, amplifying the input laser signal at step 930 can be achieved by using a gain fiber doped with erbium, in which case the signal wavelength can be with a range of about 1535 nm to about 1555 nm, and the ASE wavelength can be within a range of about 1515 to about 1535 nm.

In yet another example, amplifying the input laser signal at step 930 can be achieved by using a gain fiber doped with holmium, in which case the signal wavelength can be within a range of about 2040 nm to about 2170 nm, and the ASE wavelength can be within a range of about 1970 nm to about 2040 nm.

The method 900 can further include transmitting the input laser signal through a second optical filter disposed within the gain fiber (e.g., optical filter 325 shown in FIG. 3). The second optical filter can have a reflectivity of about 0.5% to about 10% at the ASE wavelength and a transmission of at least 95% at the signal wavelength.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for amplifying an input laser signal at a signal wavelength, the system comprising:
   an isolator to receive the input laser signal;
   a gain fiber, in optical communication with the isolator, to amplify the input laser signal, the gain fiber emitting backwards-propagating amplified spontaneous emission (ASE) at an ASE wavelength;
   at least one pump source, in optical communication with the gain fiber, to pump the gain fiber with at least one pump beam at a pump wavelength;
   a first optical filter, disposed between and in optical communication with the isolator and the gain fiber, to transmit at least 50% of the input laser signal from the isolator to the gain fiber and to reflect at least 20% of the backwards-propagating ASE back to the gain fiber, the gain fiber absorbing at least a portion of the backwards-propagating ASE reflected by the first optical filter; and
   a second optical filter disposed within the gain fiber, the second optical filter having a reflectivity of about 0.5% to about 10% at the ASE wavelength and a transmission of at least 95% at the signal wavelength.

2. The system of claim 1, wherein the gain fiber has a gain of at least about 17 dB at the signal wavelength.

3. The system of claim 1, wherein:
   the gain fiber comprises a ytterbium-doped optical fiber,
   the signal wavelength is within a range of about 1045 nm to about 1100 nm, and
   the ASE wavelength is within a range of about 1010 nm to about 1045 nm.

4. The system of claim 1, wherein:
   the gain fiber comprises a thulium-doped optical fiber,
   the signal wavelength is within a range of about 1900 nm to about 2100 nm, and
   the ASE wavelength is within a range of about 1700 nm to about 1900 nm.

5. The system of claim 1, wherein:
   the gain fiber comprises an erbium-doped optical fiber,
   the signal wavelength is within a range of about 1535 nm to about 1555 nm, and
   the ASE wavelength is within a range of about 1515 to about 1535 nm.

6. The system of claim 1, wherein:
   the gain fiber comprises a holmium-doped optical fiber,
   the signal wavelength is within a range of about 2040 nm to about 2170 nm, and
   the ASE wavelength is within a range of about 1970 nm to about 2040 nm.

7. The system of claim 1, wherein the first optical filter comprises a fiber Bragg grating (FBG).

8. The system of claim 1, wherein the first optical filter comprises a dielectric bandpass filter.

9. The system of claim 1, wherein the first optical filter has a transmissivity of greater than 80% at the pump wavelength.

10. The system of claim 1, wherein the first optical filter has a reflectivity with a bandwidth of about 1 nm to about 35 nm, the bandwidth comprising the ASE wavelength.

11. The system of claim 1, wherein the gain fiber has a small signal core absorption greater than 10 dB at the ASE wavelength.

12. The system of claim 1, wherein the signal wavelength is greater than the ASE wavelength.

13. The system of claim 1, wherein the second optical filter is formed in the gain fiber.

14. The system of claim 1, wherein the second optical filter is optically coupled to the gain fiber.

15. The system of claim 1, wherein a second reflectivity bandwidth of the second optical filter is less than a first reflectivity bandwidth of the first optical filter.

16. The system of claim 1, wherein a second reflectivity of the second optical filter is less than a first reflectivity of the first optical filter.

17. A method of amplifying an input laser signal at a signal wavelength, the method comprising:
   transmitting the input laser signal through an isolator;
   transmitting at least 50% of the input laser signal through a first optical filter in optical communication with the isolator;
   amplifying the input laser signal with a gain fiber in optical communication with the first optical filter, the gain fiber emitting backwards-propagating amplified spontaneous emission (ASE) at an ASE wavelength;
   reflecting at least 20% of the backwards-propagating ASE to the gain fiber, the gain fiber absorbing at least a portion of the backwards-propagating ASE reflected by the first optical filter; and
   transmitting the input laser signal through a second optical filter disposed within the gain fiber, the second optical filter having a reflectivity of about 0.5% to about 10% at the ASE wavelength and a transmission of at least 95% at the signal wavelength.

18. The method of claim 17, wherein amplifying the input laser light comprises amplifying the input laser light at a gain of at least about 17 dB in the gain fiber.

19. The method of claim 17, wherein:
   amplifying the input laser signal comprises transmitting the input laser light through a portion of the gain fiber doped with ytterbium,
   the signal wavelength is within a range of about 1045 nm to about 1100 nm, and
   the ASE wavelength is within a range of about 1010 nm to about 1045 nm.

20. The method of claim 17, wherein:
   amplifying the input laser signal comprises transmitting the input laser light through a portion of the gain fiber doped with thulium,
   the signal wavelength is within a range of about 1900 nm to about 2100 nm, and
   the ASE wavelength is within a range of about 1700 nm to about 1900 nm.

21. The method of claim 17, wherein:
   amplifying the input laser signal comprises transmitting the input laser light through a portion of the gain fiber doped with erbium,
   the signal wavelength is with a range of about 1535 nm to about 1555 nm, and
   the ASE wavelength is within a range of about 1515 to about 1535 nm.

22. The method of claim 17, wherein:
   amplifying the input laser signal comprises transmitting the input laser light through a portion of the gain fiber doped with holmium,
   the signal wavelength is within a range of about 2040 nm to about 2170 nm, and
   the ASE wavelength is within a range of about 1970 nm to about 2040 nm.

23. The method of claim 17, wherein transmitting the input laser signal through the first optical filter comprises transmitting the input laser light through a fiber Bragg grating (FBG).

24. The method of claim 17, wherein transmitting the input laser signal through the first optical filter comprises transmitting the input laser light through a dielectric bandpass filter.

25. The method of claim 17, wherein reflecting the backwards-propagating ASE comprises reflecting the backward ASE over a reflectivity bandwidth of about 1 nm to about 35 nm.

26. The method of claim 17, wherein the gain fiber has a small signal core absorption greater than 10 dB at the ASE wavelength and reflecting the backward ASE comprises causing the gain fiber to absorb substantially all the backward ASE reflected by the first optical filter.

* * * * *